No. 615,624. Patented Dec. 6, 1898.
G. W. MANSFIELD.
SPECTACLES.
(Application filed Apr. 19, 1898.)
(No Model.)
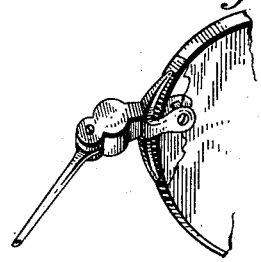
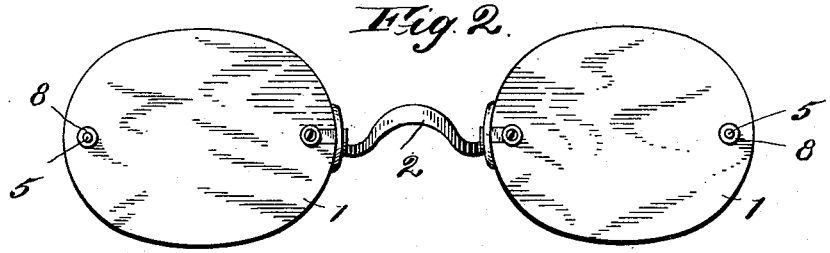
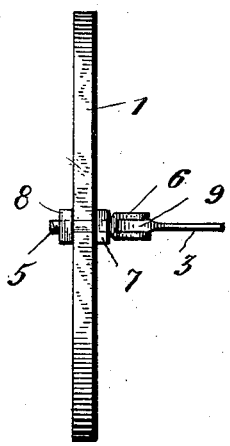
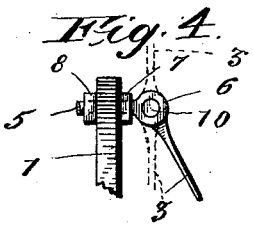
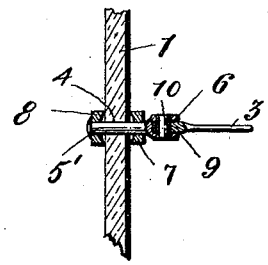
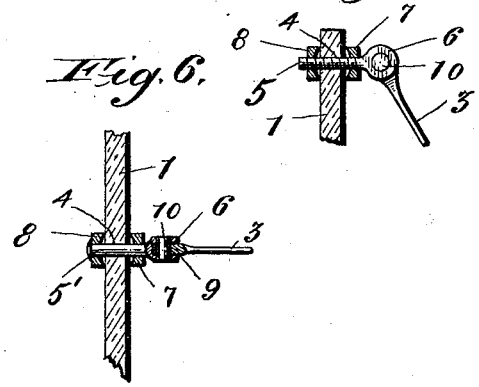
Witnesses
Inventor
George Whitney Mansfield
Attorney
THE NORRIS PETERS CO., PHOTO-LITHO., WASHINGTON, D. C.

UNITED STATES PATENT OFFICE.

GEORGE WHITNEY MANSFIELD, OF BROOKLINE, MASSACHUSETTS.

SPECTACLES.

SPECIFICATION forming part of Letters Patent No. 615,624, dated December 6, 1898.

Application filed April 19, 1898. Serial No. 678,158. (No model.)

*To all whom it may concern:*

Be it known that I, GEORGE WHITNEY MANSFIELD, a citizen of the United States, residing at Brookline, in the county of Norfolk and State of Massachusetts, have invented certain new and useful Improvements in Spectacles, of which the following is a specification.

My invention relates to spectacles, and particularly to that type of spectacles which are now in general use in which the nose-bridge and temples are secured directly to the lenses and the somewhat clumsy and heavy-appearing rims which in the older styles encircled the lenses are entirely dispensed with.

In the production of spectacles of the rimless type it has been a matter of considerable difficulty to devise means by which to firmly attach the temples to the lenses in such a manner as to give a proper and strong connection between the temple and lens and yet one which would not be unsightly in appearance or of such a character as to render the fracturing of the lens probable if lateral pressure or strain be put upon the temple. It is with a view, then, of improving the means for attaching the temple to the lens that I have invented the temple connection which I shall describe in detail hereinafter, and in the claims at the end of this specification shall set forth particularly the features of invention on which I desire protection.

In working out the invention which forms the subject-matter of this application I have borne in mind the fact that it is desirable to produce a temple connection which is simply and economically constructed, for the reason that in the higher grades of glasses in which gold mountings are used the saving in material is a matter of considerable importance. I have also so reduced the leverage or breaking strain which the temple exerts on the lens when lateral pressure is brought to bear on the temple that I have reduced the danger of fracturing the lens to a minimum.

A further advantage in the construction I have invented is that when the spectacles are in use the temple connections are hardly noticeable, but the spectacles have the appearance of the frameless pince-nez or eye glasses.

In the drawings which accompany and form a part of this specification, and to which reference will be made by letter, I have shown, in Figure 1, a temple connection of the type commonly used in order that the advantages of my temple connection over the type now in use may appear by comparison. Fig. 2 is a front view of a pair of spectacles provided with my improved temple connection. Fig. 3 is a detail edge view of a lens with the temple connection. Fig. 4 is a detail plan view of the connection shown in Fig. 3. Fig. 5 is a sectional view through the temple connection. Fig. 6 is a detail view to show a different way of securing the temple connection and its holding-pin in place in the lens.

Let 1 denote the lenses of the spectacles. 2 is the nose-bridge, and 3 the temples, all of which may be of any suitable or desired construction.

The lenses 1 have holes 4 drilled near the outer edge of their ellipses on a line with their longest diameters, and through said holes 4 pass straight pins 5, which are preferably screw-threaded, as shown. At the inner end of each of said screw-threaded pins 5 is formed a round hinge-joint 6. Between the joint and the lens 1 I place the clamping-washer 7, which is preferably concave on its inner face in order that it may have a better gripping action on the surface of the lens. Said washer 7 is slipped upon the screw-threaded temple-joint pin 5 before the latter is passed through the hole 4. It will be apparent, however, that the washer 7 might be made integral with said pin 5 in the form of a collar, if desired. On the outer end of pin 5 a screw-threaded clamping-washer 8 is placed and is adapted to be screwed up tightly against the lens 1, so as to clamp the latter between the two washers 7 and 8 and support the temple-joint 6 firmly and securely. To the joint 6 is secured the temple-head 9 by means of a pivot-pin 10. The hinge thus formed is a round hinge or joint which permits the temple-head 9 to swing to a position parallel with the lenses 1 in either direction and at right angles to the pin 5, as shown in dotted lines in Fig. 4.

In Fig. 6 I have shown the use of a rivet-pin 5' instead of a screw-threaded pin 5; but the screw-threaded pin is preferable for the reason that the parts may be assembled or separated more quickly and with less liability of fracturing the lens than when the riveted pin is used.

It will be obvious that other ways of securing the temple-joint pin in the lens, such as the use of cement or the various mechanical constructions which are appropriate for this purpose, may be used without departing from the spirit of my invention.

The advantage of my improved temple connection will, it is thought, be apparent when it is compared with the old type of temple-joint shown in Fig. 1. The superiority of the improved connection as being less conspicuous than the old form is evident. The only thing that is visible when looking directly at the front of the spectacles is the small washer 8, which is of such size as to be hardly noticeable and so placed as not to interfere with the vision of the wearer. The temple-joint being directly behind the washer cannot be seen from the front and is not at all conspicuous when seen from one side on account of the compactness of the joint and the absence of the rim-grasping fingers or points with which the old joint connection is provided.

It will be seen that in the present construction the temple connection which holds the temple and the lens together lies wholly within the margin or edge of the lens and directly in line with the pin which passes through the lens. In the type shown in Fig. 1, and so far as I am aware in temple connections commonly in use, the temple-joint is not directly in line with the pin which secures it to the lens, nor does it lie within the margin of the lens, but is thrown out of line therewith and outside of the edge of the lens to which it is secured. The result of thus offsetting the temple-joint is to increase the leverage of the temple on the edge of the lens, so as that any undue pressure is apt to fracture the lens on a line passing through the rivet-pin, as indicated by the zigzag line in Fig. 1. My improved connection minimizes the leverage exerted by the temple by placing the joint in longitudinal alinement with the pin and practically eliminates all danger of the lens being broken off at the point indicated.

The round hinge or joint by which the temple is secured to the pin, so as to allow said temple to swing freely in either direction, is advantageous, in that it allows the temples to fold closely upon the lenses when swung inwardly and when swung outwardly carries them clear of the lenses, so that the latter may be readily cleansed.

From the foregoing it is apparent that I have provided a temple connection which is simple in its construction, is inconspicuous when secured to a lens, which reduces the liability of lens breakage, and which may be readily applied to or removed from the lenses when necessary.

Having thus described my invention, I claim and desire to secure by Letters Patent—

1. In a pair of spectacles, the combination with a rimless lens, of a temple connection or support secured to said lens at its outer edge, and a temple jointed or hinged to said connection or support, said temple and its support lying wholly within the margin of the lens.

2. In a pair of spectacles, the combination with a rimless lens, of a temple connection or support secured to said lens at its outer edge, and a temple jointed or hinged to said connection or support so as to be in line with and directly behind said temple connection, said temple and its support lying wholly within the margin of the lens.

3. In a pair of spectacles, the combination with a rimless lens, of a temple connection or support consisting of a straight pin passing through a hole in the lens, means for securing said pin in place, a temple-joint formed at the inner end of said straight pin, and a temple secured to said joint, said pin, temple-joint, and temple lying wholly within the margin of the lens.

4. In a pair of spectacles, the combination with a rimless lens, of a temple connection or support consisting of a straight screw-threaded pin passing through said lens, a temple-joint formed at the inner end of said screw-threaded pin, a clamping-washer interposed between said joint and the lens, a second screw-threaded clamping-washer on the said screw-threaded pin, and a temple secured to said joint, said pin, washers, temple-joint and temple lying wholly within the margin of the lens and in longitudinal alinement with each other.

5. A temple connection or support for rimless spectacles comprising a screw-threaded pin passing through a hole in the lens, clamping-washers on said pin between which the lens is gripped, a temple-joint formed integral with said pin at its inner end, and a temple hinged to said joint so as to move freely in either direction to a plane parallel with the lenses and at right angles to said pin, said pin, clamping-washers, temple-joint and temple being wholly within the margin of the lens and in longitudinal alinement with one another.

In testimony whereof I affix my signature in the presence of two witnesses.

GEORGE WHITNEY MANSFIELD.

Witnesses:
HENRY AUSTIN,
JOSEPH H. MANSFIELD.